(12) United States Patent
Jia

(10) Patent No.: US 10,203,559 B2
(45) Date of Patent: Feb. 12, 2019

(54) CURVED DISPLAY PANEL AND CURVED DISPLAY DEVICE

(71) Applicant: BOE Technology Group Co., Ltd., Beijing (CN)

(72) Inventor: Qian Jia, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 248 days.

(21) Appl. No.: 15/206,390

(22) Filed: Jul. 11, 2016

(65) Prior Publication Data
US 2017/0192278 A1 Jul. 6, 2017

(30) Foreign Application Priority Data
Jan. 5, 2016 (CN) .......................... 2016 1 0005866

(51) Int. Cl.
G02F 1/1339 (2006.01)

(52) U.S. Cl.
CPC ........ *G02F 1/13394* (2013.01); *G02F 1/1339* (2013.01); *G02F 2201/56* (2013.01)

(58) Field of Classification Search
CPC ................................................ G02F 1/13394
See application file for complete search history.

(56) References Cited

U.S. PATENT DOCUMENTS

| 9,684,210 B2 | 6/2017 | Xiong |
| 9,696,591 B2 | 7/2017 | Zhao et al. |
| 2008/0116469 A1* | 5/2008 | Weng .................... G02F 1/1339 257/89 |
| 2015/0362767 A1 | 12/2015 | Zhao et al. |
| 2015/0370116 A1 | 12/2015 | Chae et al. |
| 2016/0170251 A1 | 6/2016 | Xiong |
| 2016/0231607 A1 | 8/2016 | Wu et al. |

FOREIGN PATENT DOCUMENTS

| CN | 103955096 A | 7/2014 |
| CN | 104111562 A | 10/2014 |
| CN | 104483773 A | 4/2015 |
| JP | H07226175 A | 8/1995 |

OTHER PUBLICATIONS

First Office Action, including Search Report, for Chinese Patent Application No. 201610005866,0, dated Apr. 3 2018, 12 pages.

* cited by examiner

*Primary Examiner* — Phu Vu
(74) *Attorney, Agent, or Firm* — Westman, Champlin & Koehler, P.A.

(57) ABSTRACT

A curved display panel includes an array substrate, an opposite substrate and a plurality of overhanging spacers which are disposed between the array substrate and the opposite substrate and located in non-display regions of the display panel. A height of the overhanging spacer is less than a spacing between the array substrate and the opposite substrate. Between the array substrate and the opposite substrate, a sealing agent structure is placed against at least one overhanging spacer in the non-display region where a side edge adjacent to a curved side edge of the array substrate or the opposite substrate is located. The sealing agent structure contacts with the overhanging spacer against which said sealing agent structure is placed, and a sum of a thickness of the overhanging spacer and a thickness of the sealing agent structure contacting with said overhanging spacer is equal to the spacing.

16 Claims, 4 Drawing Sheets (The Prior Art)

CURVED DISPLAY PANEL AND CURVED DISPLAY DEVICE

CROSS-REFERENCE TO RELATED APPLICATION

This application claims the benefit of Chinese Patent Application No. 201610005866.0 filed on Jan. 5, 2016 in the State Intellectual Property Office of China, the whole disclosure of which is incorporated herein by reference.

BACKGROUND OF THE INVENTION

Field of the Invention

Embodiments of the present disclosure relate to a field of display technology, in particular, to a curved display panel and a curved display device.

Description of the Related Art

In a curved liquid crystal display panel, in a curved state of a glass substrate, a refractive index of the glass substrate is changed due to generated stress, so that a birefringence is produced. In this case, an amount of optical retardation is produced when light is transmitted in the glass substrate (for example, array substrate and opposite substrate), along with an amount of optical retardation caused by liquid crystal in an advanced super dimension switch (ADS) mode, thus, a direction of optical axis is changed, as shown in FIG. 1. If the direction of optical axis is not parallel or perpendicular to a direction of a polaroid, a dark-state light leakage will be very serious, which will lower image display quality, decrease image contrast and reduce display effect.

SUMMARY OF THE INVENTION

According to an aspect of the present disclosure, it is provided a curved display panel, comprising an array substrate, an opposite substrate and a plurality of overhanging spacers which are disposed between the array substrate and the opposite substrate and located in non-display regions of the display panel, a height of each of the overhanging spacers being less than a spacing between the array substrate and the opposite substrate, wherein, between the array substrate and the opposite substrate, a sealing agent structure is placed against at least one overhanging spacer in the non-display region where a side edge adjacent to a curved side edge of the array substrate or the opposite substrate is located, and wherein the sealing agent structure contacts with the overhanging spacer against which said sealing agent structure is placed, and a sum of a thickness of the overhanging spacer and a thickness of the sealing agent structure contacting with said overhanging spacer is equal to the spacing between the array substrate and the opposite substrate.

In an embodiment, said at least one overhanging spacer is located on a side of the array substrate facing towards the opposite substrate, and the sealing agent structure contacting with said overhanging spacer is located on a side of the opposite substrate facing towards the array substrate. Alternatively, said at least one overhanging spacer is located on a side of the opposite substrate facing towards the array substrate, and the sealing agent structure contacting with said overhanging spacer is located on a side of the array substrate facing towards the opposite substrate.

In an embodiment, between the array substrate and the opposite substrate, a plurality of sealing agent structures are placed against two or more overhanging spacers, respectively, in the non-display region where the side edge adjacent to the curved side edge of the array substrate or the opposite substrate is located.

In an embodiment, a part of said two or more overhanging spacers are located on a side of the array substrate facing towards the opposite substrate, and a part of the sealing agent structures contacting with the overhanging spacers are located on a side of the opposite substrate facing towards the array substrate; and the other part of said two or more overhanging spacers are located on a side of the opposite substrate facing towards the array substrate, and the other part of the sealing agent structures contacting with the overhanging spacers are located on a side of the array substrate facing towards the opposite substrate.

In an embodiment, all of said two or more overhanging spacers are located on a side of the array substrate facing towards the opposite substrate, and all of the sealing agent structures contacting with said overhanging spacers are located on a side of the opposite substrate facing towards the array substrate. Alternatively, all of said two or more overhanging spacers are located on a side of the opposite substrate facing towards the array substrate, and all of the sealing agent structures contacting with said overhanging spacers are located on a side of the array substrate facing towards the opposite substrate.

In an embodiment, there are a plurality of the overhanging spacers against which the respective sealing agent structures are placed, and the plurality of the overhanging spacers are evenly distributed.

In an embodiment, multiple overhanging spacers are arranged in the non-display region where the side edge adjacent to the curved side edge of the array substrate or the opposite substrate is located, and the sealing agent structure is placed against an outermost one of the multiple overhanging spacers.

In an embodiment, multiple columns of overhanging spacers are arranged in the non-display region where the side edge adjacent to the curved side edge of the array substrate or the opposite substrate is located, and multiple sealing agent structures are placed against an outermost column of the multiple columns of overhanging spacers, respectively.

In an embodiment, the overhanging spacers against which the respective sealing agent structures are placed and the overhanging spacers against which no sealing agent structures are placed are alternately arranged.

In an embodiment, the overhanging spacers against which the respective sealing agent structures are placed and the overhanging spacers against which no sealing agent structures are placed are alternately arranged.

In an embodiment, among the outermost column of overhanging spacers, the overhanging spacers against which the respective sealing agent structures are placed and the overhanging spacers against which no sealing agent structures are placed are alternately arranged.

In an embodiment, in the non-display region where each of the side edges adjacent to the curved side edges of the array substrate and the opposite substrate is located, a total number of the overhanging spacers against which the respective sealing agent structures are placed accounts for $1/10$ to $1/2$ of a total number of the overhanging spacers in this non-display region.

In an embodiment, in the non-display region where each of the side edges adjacent to the curved side edges of the array substrate and the opposite substrate is located, ten overhanging spacers are provided, and the sealing agent structures are placed against one to five of the ten overhanging spacers, respectively.

In an embodiment, an area of a contact region between the sealing agent structure and the overhanging spacer accounts for ⅓ to 1 of an area of an end face of the overhanging spacer contacting with the sealing agent structure.

In an embodiment, an area of a contact region between the sealing agent structure and the array substrate or the opposite substrate is equal to an area of the contact region between the sealing agent structure and the overhanging spacer.

In an embodiment, an orthographic projection of the sealing agent structure on the array substrate and the opposite substrate has a shape of circle, rectangle or square.

In an embodiment, the curved display panel has a rectangle shape, and the curved side edge of the array substrate or the opposite substrate is a long side of the curved display panel.

According to another aspect of the present disclosure, it is provided a display device comprising the curved display panel according to any one of the above embodiments.

DETAILED DESCRIPTION OF PREFERRED EMBODIMENTS OF THE INVENTION

Embodiments of the present disclosure provide a curved display panel and a curved display device in order to address a problem that the dark-state light leakage is serious in the existing curved liquid crystal display panel.

In order to introduce solutions of the embodiments of the present disclosure more clearly, a technical principle of the present disclosure will be explained firstly.

Figure 1:
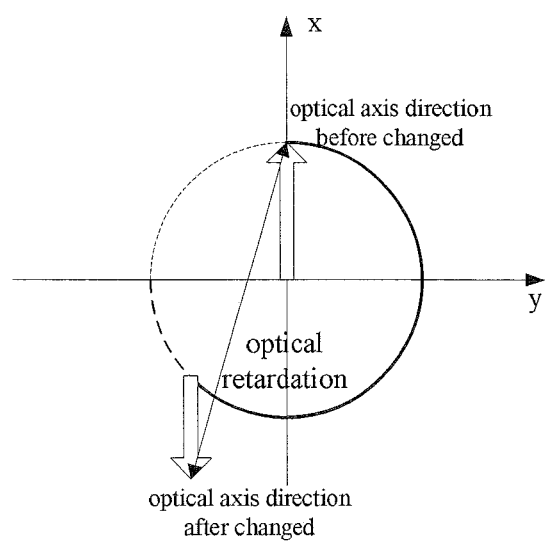
FIG. 1 is a schematic view showing that a direction of optical axis is changed in the prior art.
Figure 2:
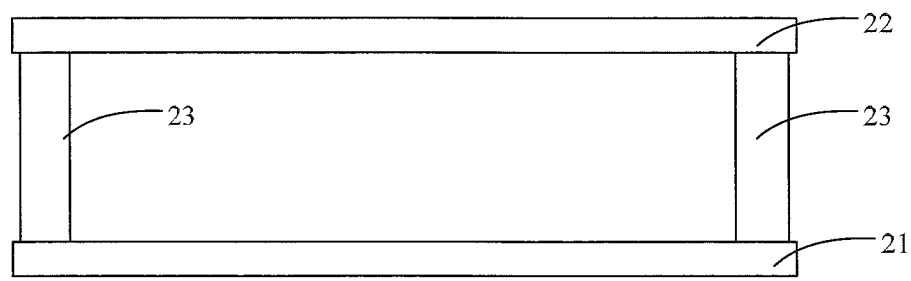
FIG. 2 is a schematic structural view of a curved display panel used for analyzing a technical principle of an embodiment of the present disclosure.

As shown in FIG. 2, a curved display panel comprises an array substrate 21, an opposite substrate 22 and a frame-sealing agent part 23 in a periphery of the curved display panel. The inventors find out that the frame-sealing agent part 23 in the periphery of the curved display panel has a great effect on the dark-state light leakage of the curved display panel. It will be analyzed from a view of forces applied to the substrate.

Figure 3:
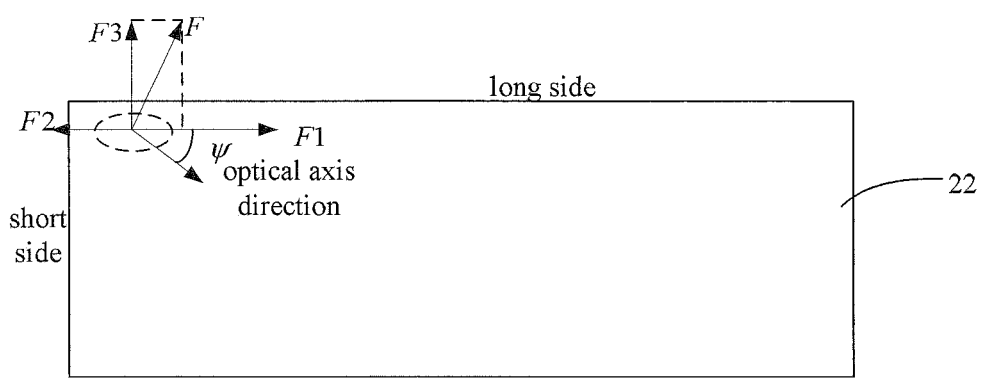
FIG. 3 is a schematic view for analyzing stresses applied on an opposite substrate in an embodiment of the present disclosure.

It will be explained by taking a left top corner of the opposite substrate 22 in FIG. 2 as an example. If a long side (as shown in FIG. 3) of the opposite substrate 22 is curved and a long side of the frame-sealing agent part 23 is also curved so that both the long side and a short side of the frame-sealing agent part 23 apply forces on the opposite substrate 22, as shown in FIG. 3, three stresses are mainly applied to the opposite substrate 22, including a stress F1 generated when the opposite substrate 22 is curved, a stress F2 which is generated to act against the force applied on the opposite substrate by the short side of the frame-sealing agent part 23, and a stress F3 which is generated to act against the force applied on the opposite substrate by the long side of the frame-sealing agent part 23. In this case, a resultant force F will be a vectorial sum of these three stresses.

As a result, the resultant force F may be calculated based on the following formula:

$$F=\sqrt{(F1-F2)^2+F3^2} \quad (1);$$

Wherein, the stress F1 generated when the opposite substrate 22 is curved may be expressed by the following formula:

$$F1=E \cdot t/(2R) \quad (2);$$

Where t is a thickness of the opposite substrate 22, E is a Young modulus of the opposite substrate 22, and R is a curved radius of the opposite substrate 22.

As a result, an optical retardation (retar.) due to the stress applied to the opposite substrate 22 may be expressed by the following formula:

$$\text{retar.}=C \cdot t \cdot F \quad (3);$$

Where C is a photoelastic coefficient of the opposite substrate 22, and t is the thickness of the opposite substrate 22.

Due to the optical retardation, an optical axis of the substrate is deflected by a deflection angle ψ, the direction of the optical axis may be expressed by the following formula:

$$\tan \psi = (F1-F2)/F3 \quad (4);$$

The inventors find out that: the nearer the deflection angle ψ of the optical axis approximates to 0° or 90°, the less the dark-state light leakage is, and the nearer the optical retardation retar. approximates to 0, the less the dark-state light leakage is. According to the formulae (1) to (4), if the curved radius is constant, then F1 is constant. In this case, in order to decrease the dark-state light leakage, it is considerable to increase F2, a direction of which is opposite to a direction of F1, so as to reduce the resultant force F. In other words, the resultant force may be reduced by counterbalancing the curved stress, so as to decrease the dark-state light leakage.

Similarly, the above technical principle may also be used in the array substrate 21.

Based on the above technical principle, the embodiments of the present disclosure provide a curved display panel and a curved display device in order to address a problem that the dark-state light leakage is serious in the existing curved liquid crystal display panel.

The curved display panel and the curved display device according to the present disclosure will be described in detail with reference to accompanying drawings and the following embodiments.

Figure 4:
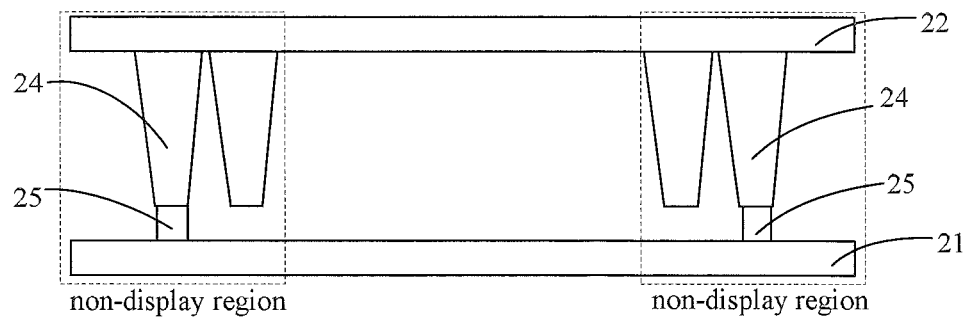
FIG. 4 is a schematic structural view of a curved display panel according to an embodiment of the present disclosure.

As shown in FIG. 4, the curved display panel according to an embodiment of the present disclosure comprises an array substrate 21, an opposite substrate 22 and a plurality of overhanging spacers 24 in a non-display region. A height of the overhanging spacer 24 is less than a spacing between the array substrate 21 and the opposite substrate 22.

Between the array substrate 21 and the opposite substrate 22, a sealing agent structure 25 is placed against at least one overhanging spacer 24 in the non-display region where a side edge adjacent to a curved side edge of the array substrate 21 or the opposite substrate 22 is located. The sealing agent structure 25 contacts with the overhanging spacer 24 against which the sealing agent structure 25 is placed. A sum of a thickness of the sealing agent structure 25 and a thickness of the overhanging spacer 24 which contacts with said sealing agent structure 25 is equal to the spacing between the array substrate 21 and the opposite substrate 22.

In the embodiment, due to being curved, a stress is generated in a direction of the curved side edge of the array substrate 21 or the opposite substrate 22. The sealing agent structure 25 is placed against the overhanging spacer 24 in the non-display region where a side edge adjacent to the curved side edge of the array substrate 21 or the opposite substrate 22 is located, and a sum of the thickness of this sealing agent structure 25 and the thickness of this overhanging spacer 24 is equal to the spacing between the array substrate 21 and the opposite substrate 22, as a result, a stress which is generated in the array substrate 21 and the opposite substrate 22 to act against a force applied by the overhanging spacer 24 and the sealing agent structure 25 may be increased, so that the stress generated due to curving may be partially counterbalanced, thereby reducing the resulant force, decreasing the deflection of the optical axis. Thus, the dark-state light leakage is reduced and the image display quality of the curved display panel is improved.

Preferably, the overhanging spacer 24 may be located on a side of the array substrate 21 facing towards the opposite substrate 22, and the sealing agent structure 25 contacting with this overhanging spacer 24 may be located on a side of the opposite substrate 22 facing towards the array substrate 22.

Alternatively, the overhanging spacer 24 may be located on a side of the opposite substrate 22 facing towards the array substrate 21, and the sealing agent structure 25 contacting with this overhanging spacer 24 may be located on a side of the array substrate 21 facing towards the opposite substrate 22.

Figure 5:
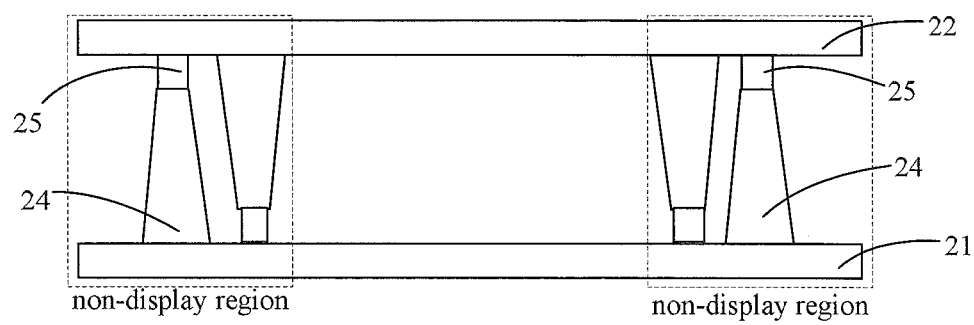
FIG. 5 is a schematic structural view of a curved display panel according to another embodiment of the present disclosure.

For example, as shown in FIG. 5, it is possible that a part of the overhanging spacers 24 are located on a side of the array substrate 21 facing towards the opposite substrate 22 while the sealing agent structures 25 contacting with these respective overhanging spacers 24 are located on a side of the opposite substrate 22 facing towards the array substrate 22, and the other part of the overhanging spacers 24 are located on a side of the opposite substrate 22 facing towards the array substrate 21 while the sealing agent structures 25 contacting with these respective overhanging spacers 24 are located on a side of the array substrate 21 facing towards the opposite substrate 22.

For example, it is also possible that all the overhanging spacers 24 are located on a side of the array substrate 21 facing towards the opposite substrate 22 while the sealing agent structures 25 contacting with these respective overhanging spacers 24 are located on a side of the opposite substrate 22 facing towards the array substrate 22. Alternatively, it is also possible that all the overhanging spacers 24 are located on a side of the opposite substrate 22 facing towards the array substrate 21 while the sealing agent structures 25 contacting with these respective overhanging spacers 24 are located on a side of the array substrate 21 facing towards the opposite substrate 22. As a result, the substrate has the same structure on one side, so that it may be manufactured more simply.

Preferably, the overhanging spacers 24 against which the sealing agent structures 25 are placed are evenly distributed, so that forces applied on the array substrate 21 and the opposite substrate 22 are uniform, so as to further improve the image display quality of the curved display panel.

The nearer the overhanging spacer 24 against which the sealing agent structure 25 is placed is positioned with regard to the side edge of the curved display panel, the more advantageously the forces applied on the array substrate 21 and the opposite substrate 22 are increased. Therefore, it is preferable to place the sealing agent structures 25 against the outermost overhanging spacers 24 in the non-display region where the side edge adjacent to the curved side edge of the array substrate 21 or the opposite substrate 22 is located. In this way, the sealing agent structures 25 are distributed at an utmost edge, so that the stresses which are generated in the array substrate 21 and the opposite substrate 22 to act against the overhanging spacer 24 and the sealing agent structure 25 become larger, so as to reduce the resulant force to the greatest extent and further reduce the dark-state light leakage.

Preferably, at the utmost edge in the non-display region where the side edge adjacent to the curved side edge of the array substrate 21 and the opposite substrate 22 is located, the overhanging spacers 24 against which the sealing agent structures 25 are placed are evenly distributed, so that the forces applied on the array substrate 21 and the opposite substrate 22 are uniform.

In the above embodiments, a distribution density of the overhanging spacers 24 against which the sealing agent structures 25 are placed may be set as required, so as to keep the forces applied on the array substrate 21 and the opposite substrate 22 within a reasonable range.

Preferably, in the non-display region where each of the side edges adjacent to the curved side edges of the array substrate 21 and the opposite substrate 22 is located, a total number of the overhanging spacers 24 against which the respective sealing agent structures 25 are placed accounts for $\frac{1}{10}$ to $\frac{1}{2}$ of a total number of the overhanging spacers 24 in this non-display region.

For example, in a non-display region of the curved display panel where the sealing agent structure 25 is required to be placed against the overhanging spacer 24, there are ten overhanging spacers 24 in total. Among these overhanging spacers 24, the sealing agent structures 25 may be placed against one to five overhanging spacers 24.

In the above embodiments, an area of a contact region between the overhanging spacer 24 and the sealing agent structure 25 also affects a magnitude of the force applied on the array substrate 21 and the opposite substrate 22. The larger the area of the contact region is, the larger the magnitude of the force applied on the array substrate 21 and the opposite substrate 22 is, thus, the larger the stresses generated in the array substrate 21 and the opposite substrate 22 are. The area of the contact region between the overhanging spacer 24 and the sealing agent structure 25 can be set as required, so as to keep the forces applied on the array substrate 21 and the opposite substrate 22 within a reasonable range.

Similarly, an area of a contact region between the sealing agent structure 25 and the array substrate 21/the opposite substrate 22 also affects a magnitude of the force applied on the array substrate 21 and the opposite substrate 22.

Preferably, an area of the contact region between the overhanging spacer 24 and the sealing agent structure 25 accounts for ⅓ to 1 of an area of an end face of the overhanging spacer 24 contacting with the sealing agent structure 25.

An area of the contact region between the sealing agent structure 25 and the array substrate 21/the opposite substrate 22 is equal to an area of the contact region between the overhanging spacer 24 and the sealing agent structure 25.

In the embodiment, an area of the contact region between the overhanging spacer 24 and the sealing agent structure 25 is not more than an area of the end face of the overhanging spacer 24, so as to prevent polluting the liquid crystal.

In the above embodiments, an orthographic projection of the sealing agent structure 25 on the array substrate 21 and the opposite substrate 22 may have a variety of shapes. Preferably, the orthographic projection of the sealing agent structure 25 on the array substrate 21 and the opposite substrate 22 may have a shape of circle, rectangle or square, but it is not limited thereto.

Preferably, the curved display panel has a rectangle shape, and the curved side edge of the array substrate 21 and the opposite substrate 22 is a long side of the curved display panel.

It should be noted that the above description is merely an example of a shape and a curved direction of the curved display panel, but it is not limited thereto.

Hereafter, a curved display panel according to an embodiment of the present disclosure will be further described in detail by taking a rectangle curved display panel as an example.

Figure 6:
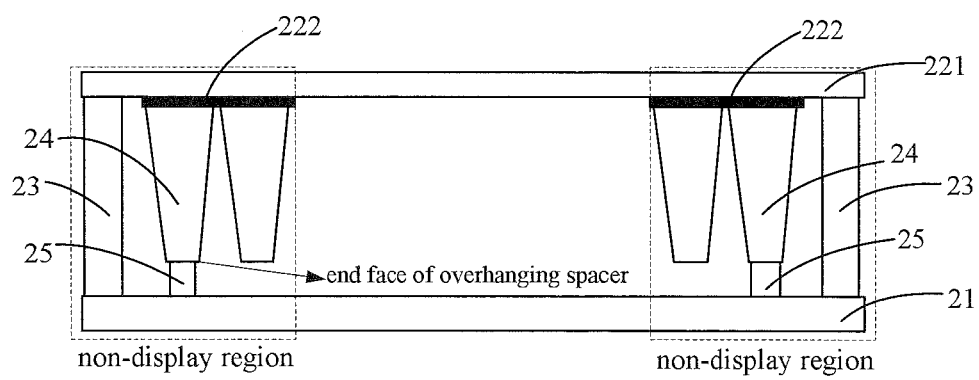
FIG. 6 is a schematic structural view of a curved display panel according to an embodiment of the present disclosure, in which a black matrix and a frame-sealing agent part are shown.

As shown in FIG. 6, in the embodiment, the curved display panel comprises an array substrate 21, an opposite substrate 22, a frame-sealing agent part 23 in a non-display region and a plurality of overhanging spacers 24 in the non-display region. Also, all the overhanging spacers 24 are located on a side of the opposite substrate 22 facing towards the array substrate 21, and a height of the overhanging spacer 24 is less than a spacing between the array substrate 21 and the opposite substrate 22.

In the embodiment, the opposite substrate 22 is a color film substrate 221 which comprises a base substrate 221 and a black matrix 222 for shading light in the non-display region. The base substrate 221 is a glass substrate.

In the embodiment, long sides of the array substrate 21 and the opposite substrate 22 are curved sides.

A sealing agent structure 25 is placed against the outermost overhanging spacer 24 in a non-display region where each of short sides of the opposite substrate 22 is located. Further, the overhanging spacers 24 against which the sealing agent structures 25 are placed are evenly distributed, and a specific distribution is shown in FIG. 7.

Figure 7:
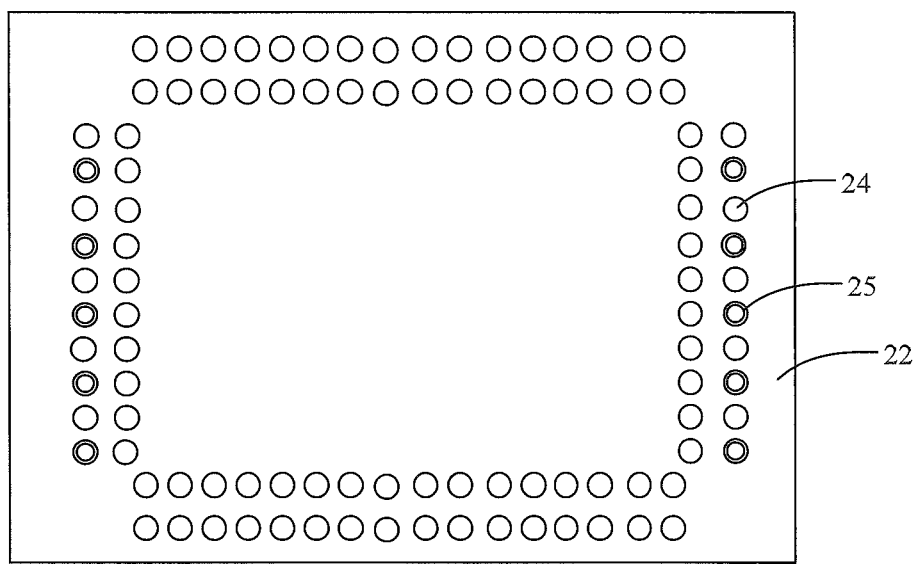
FIG. 7 is a schematic view showing a distribution of overhanging spacers, against which sealing agent structures are placed, according to an embodiment of the present disclosure.

In FIG. 7, in the non-display region where each of short sides of the opposite substrate 22 is located, among the outermost overhanging spacers 24, the overhanging spacers 24 against which the sealing agent structures 25 are placed and the overhanging spacers 24 against which no sealing agent structures 25 are placed are separately distributed, that is, the overhanging spacers 24 against which the sealing agent structures 25 are placed and the overhanging spacers 24 against which no sealing agent structures 25 are placed are alternately distributed.

In the embodiment, an orthographic projection of the sealing agent structure 25 on the opposite substrate 22 has a circular shape, and an area of the contact region between the overhanging spacer 24 and the sealing agent structure 25 accounts for ⅓ to 1 of an area of an end face of the overhanging spacer 24 contacting with the sealing agent structure 25. An area of the contact region between the sealing agent structure 25 and the array substrate 21 is equal to an area of the contact region between the overhanging spacer 24 and the sealing agent structure 25.

It should be noted that FIG. 7 is only used to show the distribution of the overhanging spacers 24 against which the sealing agent structures 25 are placed, but not show the actual structure and scale thereof.

Based on the same inventive concept, an embodiment of the present invention further provides a display device comprising the curved display panel according to any one of the above embodiments.

In the curved display panel and the curved display device according to the embodiment of the present disclosure, due to curving, a stress is generated in a direction of the curved side edge of the array substrate and the opposite substrate. The sealing agent structure is placed against the overhanging spacer in a non-display region where a side adjacent to the curved side of the array substrate and the opposite substrate is located, and a sum of the thickness of this sealing agent structure and the thickness of this overhanging spacer is equal to the spacing between the array substrate and the opposite substrate, as a result, a stress which is generated in the array substrate and the opposite substrate to act against a force applied by the overhanging spacer and the sealing agent structure may be increased, so that the stress generated due to curving may be partially counterbalanced, thereby reducing the resultant force, decreasing the deflection of the optical axis. Thus, the dark-state light leakage is reduced and the image display quality of the curved display panel is improved.

Though the above preferable embodiments of the present disclosure have been described, those skilled in the art can make further changes and modifications to these embodiments based on the basic inventive concept. Thus, the appended claims are intended to include all the preferable embodiments and all the changes and modifications which fall into the scope of the present disclosure.

Obviously, the changes and modifications can be made by those skilled in the art without departing from the spirit and scope of the present disclosure. Thus, the present is intended to include these changes and modifications if they fall into the scope of the claims and equivalents thereof.

What is claimed is:

1. A curved display panel, comprising an array substrate, an opposite substrate and a plurality of overhanging spacers which are disposed between the array substrate and the opposite substrate and located in non-display regions of the display panel, a height of each of the overhanging spacers being less than a spacing between the array substrate and the opposite substrate, wherein, between the array substrate and the opposite substrate, a sealing agent structure is placed against at least one overhanging spacer in the non-display region where a side edge adjacent to a curved side edge of the array substrate or the opposite substrate is located, wherein the sealing agent structure contacts with the overhanging spacer against which said sealing agent structure is placed, and a sum of a thickness of the overhanging spacer and a thickness of the sealing agent structure contacting with said overhanging spacer is equal to the spacing between the array substrate and the opposite substrate, and wherein the overhanging spacers against which the respective sealing agent structures are placed and the overhanging spacers against which no sealing agent structures are placed are alternately arranged.

2. The curved display panel according to claim 1, wherein said at least one overhanging spacer is located on a side of the array substrate facing towards the opposite substrate, and the sealing agent structure contacting with said overhanging spacer is located on a side of the opposite substrate facing towards the array substrate; or said at least one overhanging spacer is located on a side of the opposite substrate facing towards the array substrate, and the sealing agent structure contacting with said overhanging spacer is located on a side of the array substrate facing towards the opposite substrate.

3. The curved display panel according to claim 1, wherein, between the array substrate and the opposite substrate, a plurality of sealing agent structures are placed against two or more overhanging spacers, respectively, in the non-display region where the side edge adjacent to the curved side edge of the array substrate or the opposite substrate is located.

4. The curved display panel according to claim 3, wherein a part of said two or more overhanging spacers are located on a side of the array substrate facing towards the opposite substrate, and a part of the sealing agent structures contacting with the overhanging spacers are located on a side of the opposite substrate facing towards the array substrate; and the other part of said two or more overhanging spacers are located on a side of the opposite substrate facing towards the array substrate, and the other part of the sealing agent structures contacting with the overhanging spacers are located on a side of the array substrate facing towards the opposite substrate.

5. The curved display panel according to claim 3, wherein all of said two or more overhanging spacers are located on a side of the array substrate facing towards the opposite substrate, and all of the sealing agent structures contacting with said overhanging spacers are located on a side of the opposite substrate facing towards the array substrate; or all of said two or more overhanging spacers are located on a side of the opposite substrate facing towards the array substrate, and all of the sealing agent structures contacting with said overhanging spacers are located on a side of the array substrate facing towards the opposite substrate.

6. The curved display panel according to claim 1, wherein there are a plurality of the overhanging spacers against which the respective sealing agent structures are placed, and the plurality of the overhanging spacers are evenly distributed.

7. The curved display panel according to claim 1, wherein, multiple overhanging spacers are arranged in the non-display region where the side edge adjacent to the curved side edge of the array substrate or the opposite substrate is located, and the sealing agent structure is placed against an outermost one of the multiple overhanging spacers.

8. The curved display panel according to claim 1, wherein, multiple columns of overhanging spacers are arranged in the non-display region where the side edge adjacent to the curved side edge of the array substrate or the opposite substrate is located, and multiple sealing agent structures are placed against an outermost column of the multiple columns of overhanging spacers, respectively.

9. The curved display panel according to claim 8, wherein, among the outermost column of overhanging spacers, the overhanging spacers against which the respective sealing agent structures are placed and the overhanging spacers against which no sealing agent structures are placed are alternately arranged.

10. The curved display panel according to claim 1, wherein, in the non-display region where each of the side edges adjacent to the curved side edges of the array substrate and the opposite substrate is located, a total number of the overhanging spacers against which the respective sealing agent structures are placed accounts for $\frac{1}{10}$ to $\frac{1}{2}$ of a total number of the overhanging spacers in this non-display region.

11. The curved display panel according to claim 10, wherein, in the non-display region where each of the side edges adjacent to the curved side edges of the array substrate and the opposite substrate is located, ten overhanging spacers are provided, and the sealing agent structures are placed against one to five of the ten overhanging spacers, respectively.

12. The curved display panel according to claim 1, wherein an area of a contact region between the sealing agent structure and the overhanging spacer accounts for $\frac{1}{3}$ to 1 of an area of an end face of the overhanging spacer contacting with the sealing agent structure.

13. The curved display panel according to claim 12, wherein an area of a contact region between the sealing agent structure and the array substrate or the opposite substrate is equal to an area of the contact region between the sealing agent structure and the overhanging spacer.

14. The curved display panel according to claim 1, wherein an orthographic projection of the sealing agent structure on the array substrate and the opposite substrate has a shape of circle, rectangle or square.

15. The curved display panel according to claim 1, wherein the curved display panel has a rectangle shape, and the curved side edge of the array substrate or the opposite substrate is a long side of the curved display panel.

16. A display device comprising the curved display panel according to claim 1.

* * * * *